Jan. 5, 1960   L. A. DETERS   2,919,470
MOLD PLATE STRUCTURE
Filed May 22, 1957   3 Sheets-Sheet 1

INVENTOR.
Leroy A. Deters
BY
Atty.

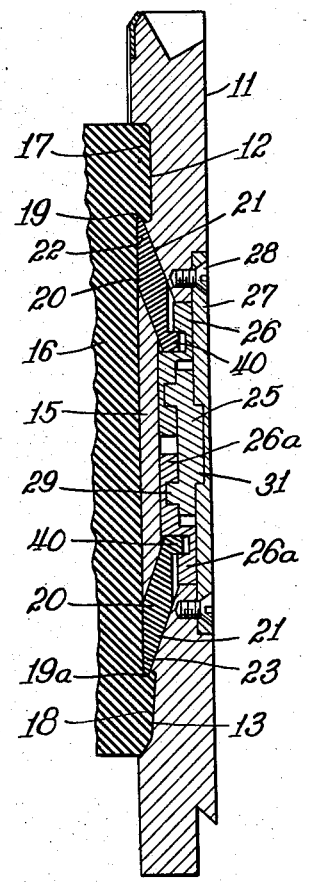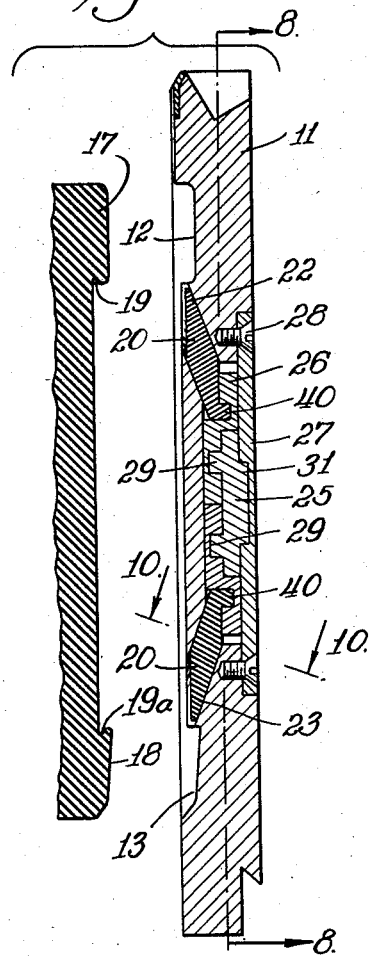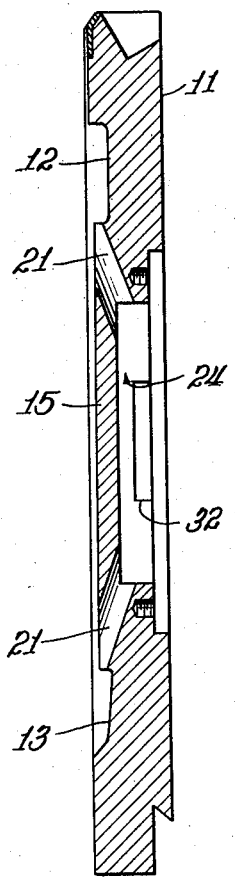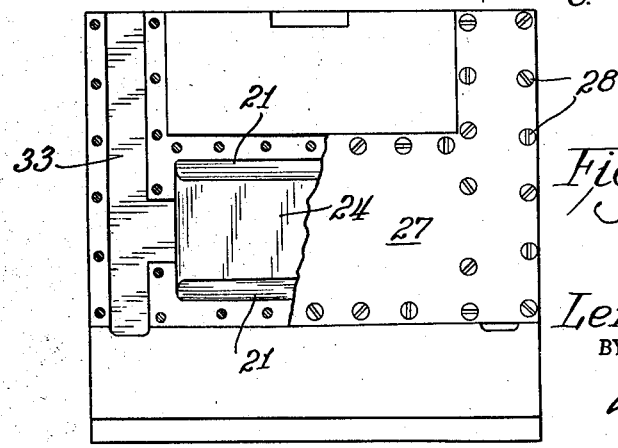

Jan. 5, 1960 L. A. DETERS 2,919,470
MOLD PLATE STRUCTURE
Filed May 22, 1957 3 Sheets-Sheet 3
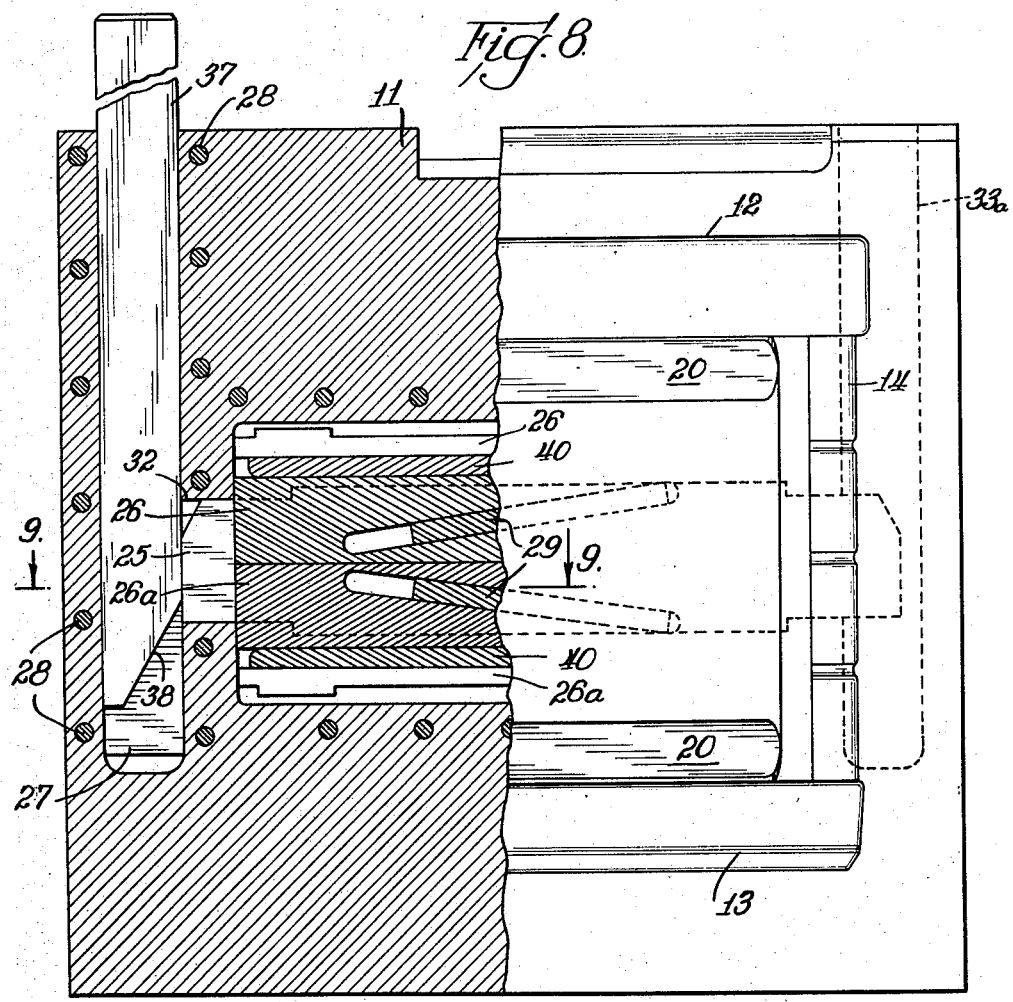
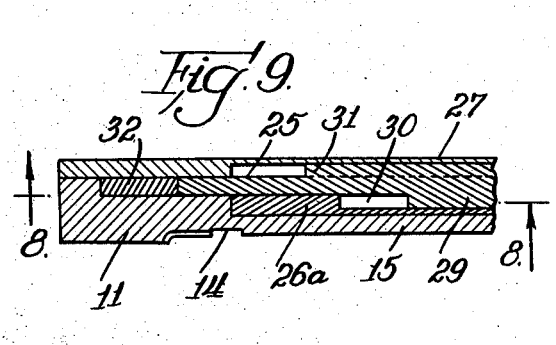
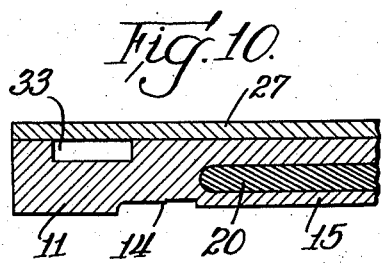
INVENTOR.
Leroy A. Deters
BY
John E. Hughes
Atty.

United States Patent Office 2,919,470
Patented Jan. 5, 1960

2,919,470

MOLD PLATE STRUCTURE

Leroy A. Deters, Davenport, Iowa, assignor to Gould-National Batteries, Inc., St. Paul, Minn., a corporation of Delaware Application May 22, 1957, Serial No. 660,833

5 Claims. (Cl. 18—34)

This invention relates to improvements in mold plates and particularly to a plate structure adapted for use as an outer wall of a pressure mold for forming storage battery containers or other molded articles.

In the manufacture of many types and sizes of storage battery containers it is desirable to provide for the attachment of name plates for identifying and describing the batteries and affording decorative effects. Heretofore such name plates have been attached to the walls of the battery containers by various means, none of which have been entirely satisfactory. Ordinarily, the name plates are secured to flat wall areas of the battery containers by the use of adhesives. Adhesives, however, when applied to suitably durable name plates have been found to be unreliable, as evidenced by the failure to retain the plates in place on a substantial proportion of the containers. The cost resulting from the time and labor consumed in attaching the plates and holding them in place while the adhesive sets is also substantial. Other types of fastening means such as screws or the like are even more unsatisfactory because of the amount of time and labor required for attaching the plates.

It is an object of the present invention to greatly facilitate the attachment of name plates by forming a wall of each container with a pair of oppositely disposed grooves having undercut surfaces adapted to receive and confine opposite edges of a name plate. Suitable name plates are preferably constructed from flexible and elastic material in flat plate or sheet form permitting the springing of opposite edges of the plates into engagement with the undercut surfaces on the containers. To this end I provide a mold plate structure having novel, readily extensible and retractile members adapted to form opposed, elongated, undercut surfaces on the battery containers or like molded objects.

A further and particular object is to provide in a mold plate structure of the class described plunger members adapted to project through openings in the front face of the mold plate and to be moved obliquely to projecting positions in which they are securely held during the molding operation in combination with means for retracting the plunger members within the openings in the plate when the latter is to be removed from a molded product.

A further object is to provide simple and reliable mechanism for actuating such plunger members to their extended positions and then retracting them to free the mold plate from the molded product wherein the several moving parts are all completely enclosed in a chamber in the mold plate.

My invention also includes certain other novel features of construction which will be more fully pointed out in the following specification and claims.

In the accompanying drawings a mold plate structure embodying my improvements is shown by way of example and not for the purpose of limitation.

Referring to the drawings:

Fig. 4 is a central vertical sectional view showing the mold plate assembly with the plunger members extended and showing a portion of a molded object in contact with the inner face of the mold plate;

Fig. 5 is a similar vertical sectional view of the plate assembly with plunger members retracted and a portion of the molded object separated from the plate;

Fig. 6 is a vertical sectional view of the mold plate alone;

Fig. 7 is an outer side elevational view of the mold plate, together with a portion of the outer face plate;

Fig. 8 is a part inner face elevational view and part vertical sectional view taken on the line 8—8 of Fig. 5, showing the assembly with the plunger members in their retracted positions;

Fig. 9 is a fragmentary horizontal sectional view taken on the line 9—9 of Fig. 8, and Fig. 10 is a fragmentary sectional view taken on the line 10—10 of Fig. 5.

Figure 1:
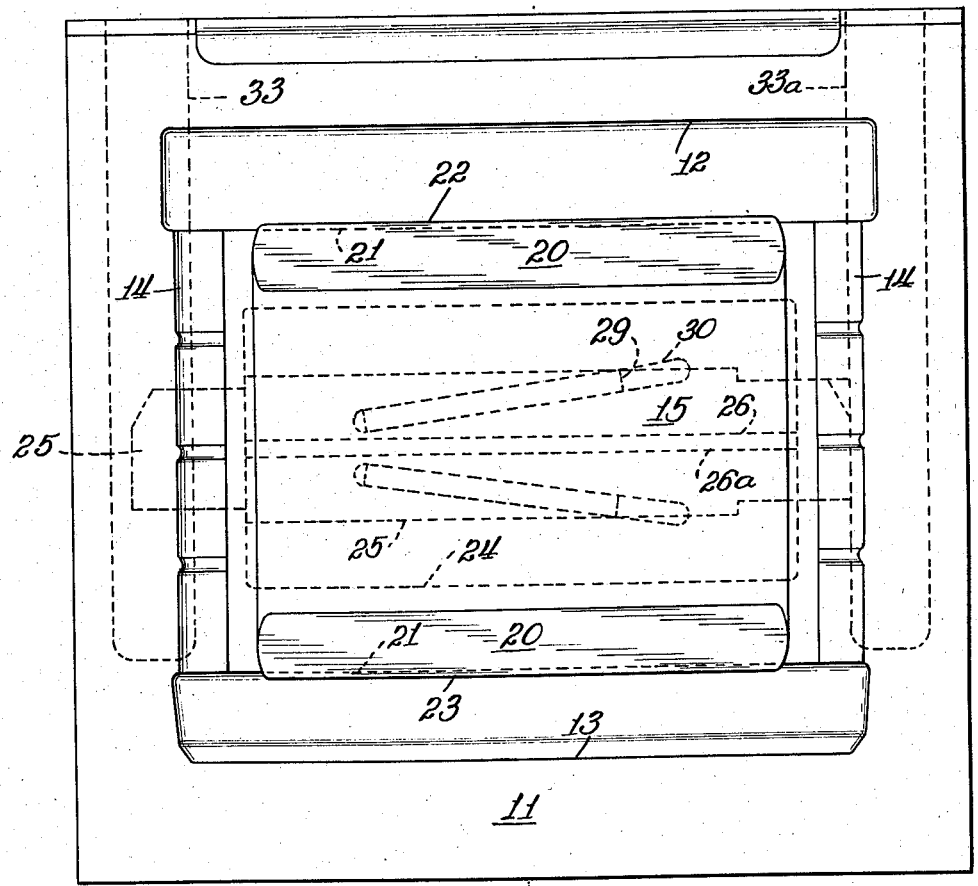
Figure 1 is an elevational view of my improved mold plate assembly showing the inner face thereof.

In the drawing, my mold plate, indicated generally by the numeral 11, has an inner or front face formed with horizontally extending, elongated recesses 12 and 13 for molding the upper and lower margins of the container and relatively shallow recesses 14 for molding the vertical corner portions of the container extending between the recesses 12 and 13. The central portion of the plate has a flat area 15 bounded by the recesses 12, 13 and 14 and adapted to form the surface area of the mold container which is to be covered by a name plate.

In Figs. 4 and 5 a portion of a molded container wall is indicated in vertical section at 16 and has along its upper and lower margins protruding portions 17 and 18 which conform to the recesses 12 and 13 respectively. Extending along the lower side of the portion 17 is a groove having an undercut surface 19. An oppositely disposed groove having an undercut surface 19a extends along the upper side of the portion 18. The grooves having these undercut surfaces are adapted to receive the upper and lower margins of a name plate.

Such grooves having undercut surfaces 19 and 19a are formed by a pair of plunger members 20 one of which is extensible obliquely upward to form the surface 19 and the other of which is extensible obliquely downward to form the surface 19a. Specifically, an upper edge portion 22 of the upper plunger member 20 forms the groove having surface 19 and a lower edge portion 23 of the lower plunger member 20 forms the groove having the surface 19a when the plunger members are in the projecting positions indicated in Fig. 4. Flat inner surfaces on the plunger members 20 are preferably positioned in a common plane with the flat surface area 15 when these members are extended. Inclined slots 21 are formed in the plate 11 to guide the plunger members 20, and outer edge portions of these members project into a chamber 24 formed in the mold plate 11. This chamber contains an elongated wedge bar 25 and a pair of link members 26, 26a which operatively connect the upper and lower plunger members 20 to the wedge bar 25. At its outer side the chamber 24 is closed by a back plate 27 which fits in a recess formed in the mold plate 11 and is held in place by suitable fastening means, e.g., screws 28 (Figs. 5, 7 and 8).

Figure 2:
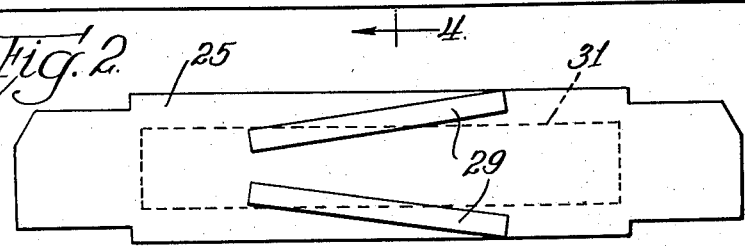
Fig. 2 is an elevational detail view showing the inner side of the longitudinally movable wedge bar.
Figure 3:
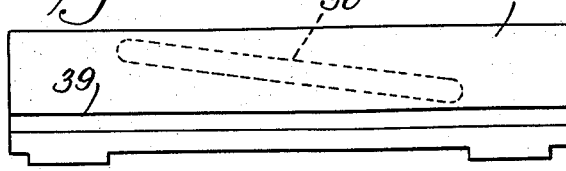
Fig. 3 is an elevational view showing the inner side of one of the plunger link members.

As best shown in Figures 2, 3 and 8, the wedge bar 25 is formed at its inner or front side with a pair of obliquely diverging tongue members 29 adapted to slidably fit in similarly diverging grooves 30 formed in the respective link members 26 and 26a. A horizontally elongated guide member 31 projects from the outer side of the bar 25 and slidably fits in a horizontally elongated groove formed in the back plate 27. Each end portion of the wedge bar 25 slidably fits in a horizontal guideway 32 formed in the mold plate 11. Access to the left end of the wedge bar 25 (Figs. 1 and 8) is afforded by a vertical guideway 33 which is open at the upper edge of the mold plate and a similar vertical guideway 33a near the opposite vertical edge of the plate affords access to the right end of the wedge bar. These vertical guideways are adapted to receive a key 37 for actuating the wedge bar. At the outer side of the mold plate the guideways 33 and 33a are closed by the back plate 27.

Key 37 which is long enough to project from the upper end of either of its guideways constitutes means for actuating the wedge bar longitudinally from left to right or from right to left and to lock the wedge bar in either selected position. As shown in Fig. 8, the lower end of the key 37 is formed with a beveled surface 38 adapted to slidably engage coacting beveled end surfaces of the wedge bar 25. The length of this wedge bar is such as to cause one end to project into the guideway 33 when the other end is retracted from the guideway 33a. When the key 37 is in an operative position such as that indicated in Fig. 8 or in a similar position in the guideway 33a, the wedge 25 is locked against movement longitudinally in either direction.

Each of the link members 26 and 26a has a tongue and groove connection with one of the plunger members 20. This connection comprises a horizontally extending groove 39 in the link member in continuous interlocking engagement with a tongue 40 formed on the plunger member. Limited vertical movement of the link members 26 in the chamber 24 affords the range of movement of the plunger members 20 between their retracted positions indicated in Figs. 5 and 8 and their extended positions indicated in Figs. 1 and 4. The link members 26 and 26a are confined however, against horizontal or longitudinal movement by end surfaces of the chamber 24, as indicated in Figs. 8 and 9.

In the molds with which my improved mold plate is used, provision is made for fastening four separable mold plates in place as the outer wall surface forming members of the mold. For such use the lower margin of my mold plate 11 is formed to be removably or hingedly secured to a base plate of the mold (not shown) and the upper edge of the plate 11 is held against outward movement during the pressure molding operation. Upon completion of a molding operation the material contained in the mold is allowed to set and then the several mold plates constituting the outer wall members of the mold are moved outwardly from the molded object to release the latter.

In operation, assuming that the plunger members 20 are in their retracted positions indicated in Figs. 5 and 8, the key 37 is withdrawn upward from or in the guideway 33 and this key or a duplicate thereof is inserted in the guideway 33a at the opposite side of the mold plate and is driven downward to move the wedge bar 25 to the left from the position shown in Fig. 5 to the position indicated in Fig. 1. This causes the tongues 29 on the bar 25 to coact with the grooves 30 in the link members 26 and 26a to separate the latter members along a horizontal center line of the chamber 24 and to move them in upward and downward directions respectively. By reason of the interlocking engagement of the tongue members 40 of the plunger members 20 with the grooves 39 in the link members 26 and 26a the plunger members 20 are thereby extended, one obliquely upward and the other obliquely downward so that their edge portions 22 and 23 project from the inner face of the mold plate.

Now the mold may be closed and the molding operation performed in the usual or suitable manner to form the wall member 16 of the container or other molded article. This operation is performed while the material in the mold is sufficiently fluid and under pressure to force the material into the recesses in the mold plate including the recesses 12 and 13 and at both sides of the extended edge portions 22 and 23 of the plunger member 20, to thereby form the undercut surfaces 19 and 19a in the container wall. Thereafter, upon the setting of the material, the plunger members 20 are retracted. This is accomplished quickly and easily by merely inserting the key member 37 in its guideway 33 and driving the key downward to actuate the wedge bar 25 to the right from the position shown in Fig. 1. The link members 26 and 26a operatively connecting the wedge bar 25 to the plunger members 20 thereby retract the plunger members to a position such as that indicated in Figs. 5 and 8 wherein their edge portions 22 and 23 are withdrawn from the undercut surfaces 19 and 19a of the molded container wall. The mold plate is finally moved away from the molded article to free the latter for removal from the mold.

It will be noted that all of the moving parts required to operate the plunger members to and from their extended positions are enclosed in the mold plate chamber 24 and guideways communicating therewith. Only the key 37 extends to the exterior of the mold plate and is removable from the mold plate assembly. Ample clearance is provided between the several moving parts and their guiding and actuating mechanism to allow for expansion and contraction when the mold plate is subjected to the range of temperatures, usually exceeding 300 degrees F., required for ordinary plastic molding operations. My improved mold plate is also designed to withstand mold pressures within the range employed in this art.

Operation of my improved mold structure has demonstrated that it greatly facilitates the formation of undercut surfaces and that the several movable members which coact in extending and retracting the plunger members are simple, durable and reliable in operation. My arrangement of the plunger members which are retracted to release the container from the mold is unique in eliminating chipping and other damage to surfaces defining the undercut grooves and adjacent areas of the molded object.

I claim:

1. In a mold for forming undercut surfaces on a molded object, a mold plate having inner and outer faces of relatively large area in relation to the thickness of said plate and formed with an elongated chamber extending between the inner and outer faces of said plate and a pair of elongated guide slots extending laterally from said chamber to the inner face of said plate, a pair of elongated plunger members movable in said guide slots selectively to and from the inner face of said plate and having marginal portions adapted to project at the inner face of said plate and to form oppositely disposed undercut grooves in the object to be molded, an elongated wedge bar movable longitudinally of said plunger members in said chamber, means for actuating said wedge bar longitudinally in said chamber, and means operatively connecting said plunger members to said wedge bar comprising a pair of elongated tongue and groove members for actuating each plunger member, extending obliquely along said wedge bar in said chamber, the tongue and groove members for actuating one of said plunger members diverging longitudinally of said wedge bar relative to the pair for actuating the other plunger member whereby said plunger members may be selectively extended from the inner face of said plate or retracted within said guide slots when said wedge bar is moved longitudinally in said chamber.

2. A mold plate in accordance with claim 1 wherein said means for actuating the wedge bar longitudinally in said chamber comprises guideways disposed at opposite ends of said chamber to receive the respective ends of said wedge bar and a key movable in said guideways and formed to engage the ends of said bar to actuate it selectively in opposite directions.

3. A combination in accordance with claim 1 in which said tongue and groove members are relatively movable in a plane which is parallel to the inner face of said plate.

4. A combination in accordance with claim 1 in which said means operatively connecting said plunger members to said wedge bar include a pair of elongated link members disposed in sliding contact with said wedge bar, and means operatively connecting each of said link members to one of said plunger members, said tongue and groove members being formed on said link members and wedge bar.

5. A combination in accordance with claim 4 in which said means operatively connecting the several link members to the respective plunger members comprise parallel tongue and groove members so proportioned as to permit limited movement of the plunger members to and from the inner face of said mold plate.

References Cited in the file of this patent

UNITED STATES PATENTS

| | | |
|---|---|---|
| 1,918,532 | Geyer | July 18, 1933 |
| 2,115,590 | Ryder | Apr. 26, 1938 |
| 2,366,475 | Bartholomew | Jan. 2, 1945 |
| 2,487,703 | Gougler | Nov. 8, 1949 |

FOREIGN PATENTS

| | | |
|---|---|---|
| 176,042 | Germany | Mar. 15, 1904 |